United States Patent [19]
Rieger

[11] 3,974,641
[45] Aug. 17, 1976

[54] SERIES OF MATCHED SETS OF COMPATIBLE CHAIN-SYSTEM PARTS

[76] Inventor: Werner Rieger, Haus Haselbach, 7084 Unterkochen, Wurttemberg, Germany

[22] Filed: June 19, 1974

[21] Appl. No.: 480,601

[30] Foreign Application Priority Data
July 6, 1973   Germany............................ 2335131

[52] U.S. Cl. ................................................. 59/93
[51] Int. Cl.² ....................................... F16G 15/06
[58] Field of Search ............. 59/93, 86, 85; 294/82, 294/83, 74

[56] References Cited
UNITED STATES PATENTS
| | | | |
|---|---|---|---|
| 1,836,169 | 12/1931 | Humphreys | 59/93 |
| 2,869,255 | 1/1959 | Page | 59/86 |

FOREIGN PATENTS OR APPLICATIONS
| | | | |
|---|---|---|---|
| 1,192,081 | 5/1970 | United Kingdom | 59/86 |

Primary Examiner—Victor A. Di Palma
Assistant Examiner—Gene P. Crosby
Attorney, Agent, or Firm—Smythe & Moore

[57] ABSTRACT

The invention relates to a series of matched sets of parts for a chain system, each set including a chain link of round-section bar, a connecting member and a lockable retainer pin for retaining the link in engagement in a slot in the connecting member. The invention provides that in order to ensure that links and connecting members which are incompatible in strength cannot be joined together, the bar diameters of the chain links, the widths of the slots in the connecting members, the internal widths of the links and the diameters of the retaining pins are varied stepwise from size to size from one matched set to the next in the series.

2 Claims, 3 Drawing Figures

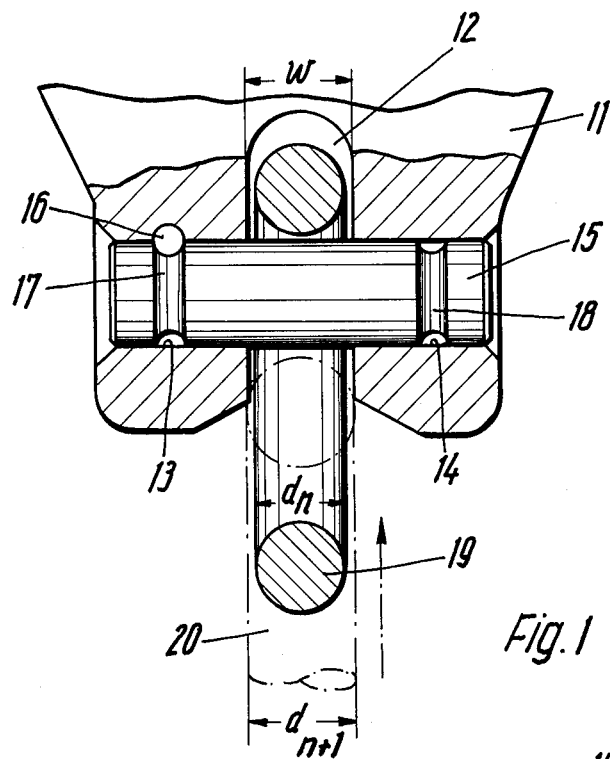
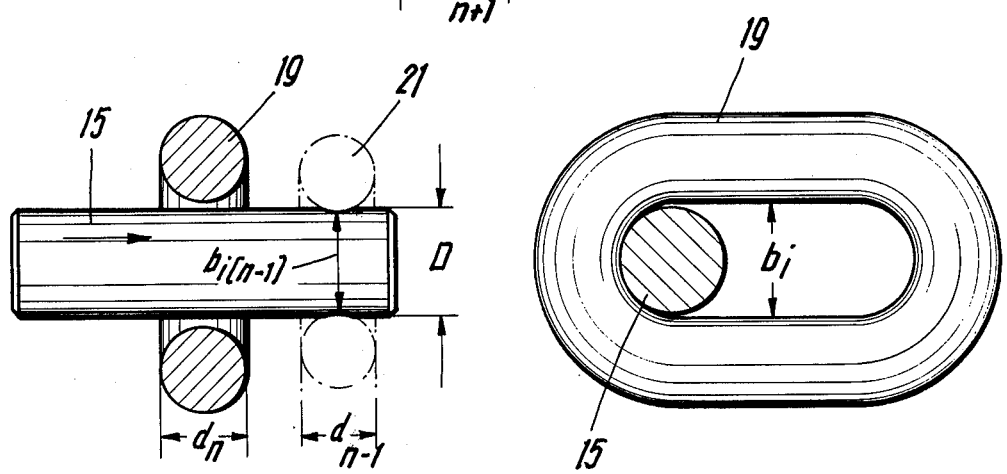
Fig. 1
Fig. 2
Fig. 3

SERIES OF MATCHED SETS OF COMPATIBLE CHAIN-SYSTEM PARTS

The invention relates to a series of matched sets of compatible chain-system parts comprising chain links of round-section bar and attachable connecting members, for use in suspending chains from supports, shortening the chains, joining chains together, suspending objects from the chains and attaching objects to the chains, each connecting member having a slot to accommodate a compatible chain link and a lockable retainer pin compatible with the link for retaining it in the slot.

Matched sets of parts of this kind can be assembled together to form chain systems for a variety of applications. In doing this it is important to ensure that all the parts of the system are compatible with each other in strength. The known matched sets leave it partly to the discretion of the user to ensure that only compatible parts are joined together. This involves the risky supposition that the user not only applies sufficient care in selecting the individual parts of the chain system but also has previously been given appropriate instructions.

The aim in the present invention is to propose a series of matched sets of chain-system parts so arranged and constructed that incompatible parts, that is to say parts which are either too strong or too weak, cannot possibly be assembled together to form the chain system.

The problem is solved according to the invention in that in order to ensure that links and connecting members incompatible in strength cannot be joined together, the bar-diameters of the chain links, the widths of the slots in the connecting members, the internal widths of the chain links and the diameters of the retainer pins vary stepwise from size to size from one matched set to the next in the series in such a way that only links and connecting members compatible in strength can be joined together.

The matched sets of parts according to the invention are based on the principle that the bar-diameters of the chain links, their internal widths and the corresponding dimensions of the attachable compatible connecting members of the matched sets all increase stepwise in the series of sizes in such a way that it is impossible to attach an incompatible chain link to a connecting member, that is to say a chain link which is either too strong or too weak. This obviates all risk that a chain capable of supporting a given load could be connected to a weaker connecting member, or that a connecting member able to take a given load could be connected to a weaker chain link.

The invention will be now described in greater detail with reference to the accompanying drawing, in which:

FIG. 1 is a partly sectioned side view of an attachable connecting member, showing the slot into which a compatible chain link can be introduced, the slot being too narrow to take an excessively large chain link.

FIG. 2 shows the lockable retainer pin inserted through a compatible chain link, the diameter of the pin being too great to allow insertion through a chain link of insufficient width.

FIG. 3 shows a cross section through the retainer pin, which has been inserted through the compatible chain link represented in FIG. 2.

FIG. 1 shows an attachable connecting member 11 designed to take only a compatible chain link. The connecting member has a slot 12 of width $w$, to accommodate the compatible chain link 19. The connecting member 11 has two bores 13, 14 in line with each other. A compatible retainer pin 15 having a diameter D is shown inserted through the bores. The connecting member also has a transverse bore 16 to take a locking pin, which engages in one of the two annular grooves 17, 18 of the retainer pin.

A compatible chain link 19 is shown introduced into the slot 12. The chain link 19 has a bar-diameter $d_{(n)}$ and an internal width $b_{i(n)}$.

In FIG. 1 an incompatible chain link 20 is shown in dotted lines, this chain link having the next larger bar-diameter $d_{(n+1)}$ in the series of sizes. It will be observed that the bar-diameter is too great to allow this link to be introduced into the slot 12 of the connecting member. It is therefore not possible to connect a chain having a given load-carrying capacity to a weaker connecting member.

FIG. 2 shows that an incompatible chain link 21 which has the next smaller bar-diameter $d_{(n-1)}$, that is to say a chain link which is too weak, cannot be attached to the connecting member because its internal width $b_{i(n-1)}$ is too small to allow the compatible retainer pin with diameter D, to be inserted through it. Consequently a weaker chain link cannot be attached to the connecting member 11 and retained by a pin compatible with the connecting member 11.

Advantageously, in each matched set the width of the slot is about 1.1 or 1.2 times the bar-diameter of the compatible chain link, the diameter of the retainer pin being about 1.2 times this bar-diameter, the bar-diameter and the internal width of the link increasing by 25% from the one size of link to the next larger size in the series of matched sets.

By way of example the components of a series of matched sets, each of compatible size, might have dimensions (in millimeters) as given in the following table:

| Link Bar-Diameter d | Connecting Member Slot Width w | Pin Diameter D | Internal Link Width $b_i$ |
|---|---|---|---|
| 6 | 7.2 | 7.0 | 7.8 |
| 8 | 9.5 | 9.5 | 10.4 |
| 10 | 12.0 | 12.0 | 13.0 |
| 13 | 15.5 | 15.5 | 17.0 |
| 16 | 17.6 | 19.0 | 21.0 |
| 18 | 21.5 | 21.5 | 23.4 |
| 22 | 26.5 | 26.5 | 28.6 |

I claim:

1. A series of matched sets of parts for a chain system comprising chain links of round-section bar and attachable connecting members for joining chains together, each connecting member having a slot to accommodate a chain link and a lockable retainer pin for retaining a chain link in said slot, wherein links and connecting members which are incompatible in strength cannot be joined together, the bar-diameters of said chain links, the widths of the slots in the connecting members, the internal widths of the links and the diameters of the retaining pins vary stepwise from size to size from one matched set to the next in the series in that the diameters of said retainer pins are each approximately 1.2 times the bar-diameters of the compatible chain links, and the bar-diameters and the internal widths of said links increase by approximately 25% from one size link to the next larger size in the series of matched sets whereby only links and connecting members compatible in strength can be joined together.

2. A series of matched sets as claimed in claim 1, wherein the components of the series of sets each of compatible size have the following approximate dimensions in millimeters:

| Link Bar-Diameter d | Connecting Member Slot Width w | Pin Diameter D | Internal Link Width $b_i$ |
|---|---|---|---|
| 6 | 7.2 | 7.0 | 7.8 |
| 8 | 9.5 | 9.5 | 10.4 |
| 10 | 12.0 | 12.0 | 13.0 |
| 13 | 15.5 | 15.5 | 17.0 |
| 16 | 17.6 | 19.0 | 21.0 |
| 18 | 21.5 | 21.5 | 23.4 |
| 22 | 26.5 | 26.5 | 28.6. |

* * * * *